(12) United States Patent
Kote et al.

(10) Patent No.: US 9,275,010 B2
(45) Date of Patent: Mar. 1, 2016

(54) METHOD FOR IMPROVING FUEL ECONOMY OF AN OPERATED VEHICLE

(71) Applicant: Automatic Labs, Inc., San Francisco, CA (US)

(72) Inventors: Thejovardhana S. Kote, San Francisco, CA (US); David Theron Palmer, San Francisco, CA (US); Jerald Jariyasunant, San Francisco, CA (US); Ramprabhu Jayaraman, San Francisco, CA (US); Ljubinko Miljkovic, San Francisco, CA (US)

(73) Assignee: Automatic Labs, Inc., San Francisco, CA (US)

( * ) Notice: Subject to any disclaimer, the term of this patent is extended or adjusted under 35 U.S.C. 154(b) by 102 days.

(21) Appl. No.: 13/862,111

(22) Filed: Apr. 12, 2013

(65) Prior Publication Data

US 2013/0275013 A1  Oct. 17, 2013

Related U.S. Application Data

(60) Provisional application No. 61/623,424, filed on Apr. 12, 2012.

(51) Int. Cl.
*G06F 17/00* (2006.01)
*G07C 5/00* (2006.01)
*G01C 21/34* (2006.01)

(52) U.S. Cl.
CPC ............... *G06F 17/00* (2013.01); *G07C 5/008* (2013.01); *G01C 21/3469* (2013.01)

(58) Field of Classification Search
CPC ..... G06F 17/00; G07C 5/008; G01C 21/3469
USPC .......... 701/31.4, 33, 33.2, 51, 123, 22, 36, 49
See application file for complete search history.

(56) References Cited

U.S. PATENT DOCUMENTS

| | | | |
|---|---|---|---|
| 6,092,021 A * | 7/2000 | Ehlbeck et al. | 701/123 |
| 6,594,579 B1 * | 7/2003 | Lowrey et al. | 701/123 |
| 9,147,293 B2 * | 9/2015 | Adams | G06C 5/008 |
| 2004/0093264 A1 * | 5/2004 | Shimizu | 705/13 |
| 2008/0162193 A1 * | 7/2008 | Voggenauer | G06Q 40/08 705/4 |
| 2009/0005974 A1 * | 1/2009 | Lenneman et al. | 701/209 |
| 2009/0271107 A1 * | 10/2009 | Smith | 701/201 |
| 2010/0030458 A1 * | 2/2010 | Coughlin | 701/123 |
| 2010/0250059 A1 * | 9/2010 | Sekiyama et al. | 701/123 |
| 2010/0262333 A1 * | 10/2010 | Storgaard | G06C 5/008 701/31.4 |
| 2011/0112717 A1 * | 5/2011 | Resner | 701/33 |
| 2011/0258044 A1 * | 10/2011 | Kargupta | 705/14.49 |
| 2012/0176255 A1 * | 7/2012 | Choi et al. | 340/989 |

(Continued)

*Primary Examiner* — Calvin Cheung
*Assistant Examiner* — Angelina Shudy
(74) *Attorney, Agent, or Firm* — Donald R. Boys; Central Coast Patent Agency, Inc.

(57) ABSTRACT

In one embodiment of the present invention, an apparatus is provided comprising a connector to an onboard diagnostics (OBD) port of a vehicle, wireless communications circuitry, and a processor and a memory, the memory storing instructions that when executed by the processor cause the processor to monitor fuel consumption of the vehicle relative to mileage driven to derive fuel efficiency values, monitor driving behavior concurrently and associating certain driving behaviors to any dips and rises in the fuel efficiency values, and transmit the values and associated data to a wireless communications appliance wirelessly paired to communicate with the apparatus.

18 Claims, 4 Drawing Sheets

(56) References Cited

U.S. PATENT DOCUMENTS

| | | | | |
|---|---|---|---|---|
| 2012/0232747 A1* | 9/2012 | Miners | ............... | G07C 5/006 |
| | | | | 701/33.9 |
| 2012/0239462 A1* | 9/2012 | Pursell | ............... | G06C 5/085 |
| | | | | 705/7.38 |
| 2012/0283940 A1* | 11/2012 | Smith | ............... | 701/123 |
| 2013/0113615 A1* | 5/2013 | Jin | ............... | G07C 5/0825 |
| | | | | 340/439 |
| 2013/0253782 A1* | 9/2013 | Saltsman | ............... | G01M 17/007 |
| | | | | 701/51 |
| 2013/0332024 A1* | 12/2013 | Garrett | ............... | G07C 5/008 |
| | | | | 701/29.4 |
| 2014/0032087 A1* | 1/2014 | Shiri | ............... | G06F 17/00 |
| | | | | 701/117 |
| 2014/0100767 A1* | 4/2014 | Miljkovic et al. | ............... | 701/123 |
| 2014/0114532 A1* | 4/2014 | Choi et al. | ............... | 701/36 |
| 2015/0228129 A1* | 8/2015 | Cox | ............... | G07C 5/08 |
| | | | | 701/29.1 |

\* cited by examiner

METHOD FOR IMPROVING FUEL ECONOMY OF AN OPERATED VEHICLE

CROSS-REFERENCE TO RELATED DOCUMENTS

The present application claims priority to provisional patent application 61/623,424 filed Apr. 12, 2012, and the disclosure of the parent application is incorporated herein in entirety at least by reference.

BACKGROUND OF THE INVENTION

1. Field of the Invention

The present invention is in the field of fuel economy management and pertains particularly to a system for collecting fuel consumption data and driving behavioral data from a monitored vehicle and providing feedback information to a user.

2. Discussion of the State of the Art

In the field of fuel economy management, there is currently no simple method for collecting fuel consumption data and driving behavioral data and processing those data to derive ongoing fuel economy information that may be made available to consumers. Most consumers have no real idea about the actual fuel efficiency of their vehicles under operating conditions. To manage fuel economy, consumers typically monitor their fuel consumption manually such as by filling up the fuel tank with known capacity and then logging mileage driven until the next refill. These rather inefficient and non-standardized processes can lead operators to spend more money than necessary on fuel for their vehicles.

Therefore, what is clearly needed is an inexpensive system that automatically gathers and reports the fuel consumption data of a vehicle in operation and, if desired, the driving behaviors of the operator and processes the data along with fuel costs relative to locality or region of operation to help drivers lower fuel costs by improving fuel efficiency.

SUMMARY OF THE INVENTION

In one embodiment of the present invention, an apparatus is provided comprising a connector to an onboard diagnostics (OBD) port of a vehicle, wireless communications circuitry, and a processor and a memory, the memory storing instructions that when executed by the processor cause the processor to monitor fuel consumption of the vehicle relative to mileage driven to derive fuel efficiency values, monitor driving behavior concurrently and associate certain driving behaviors to any dips and rises in the fuel efficiency values, and transmit the values and associated data to a wireless communications appliance wirelessly paired to communicate with the apparatus.

In one embodiment of the invention, the wireless circuitry is Bluetooth™ circuitry. In one embodiment, the driving behaviors monitored include transmission gear shifting, braking, accelerating, and steering. In one embodiment of the invention, the wireless communications appliance is one of a cell phone, an android device, a tablet computer, or a laptop computer.

In one aspect of the present invention, a method is provided comprising the acts monitoring fuel consumption of a vehicle relative to mileage driven and deriving fuel efficiency values via an apparatus having a connector to an onboard diagnostics (OBD) port of a vehicle, wireless communications circuitry, and a processor and a memory, monitoring, via the apparatus, driving behavior concurrently with fuel consumption and associate certain driving behaviors to any dips and rises in the fuel efficiency values, transmitting, from the apparatus, the fuel efficiency values and associative data collected during monitoring to a wireless communications appliance wirelessly paired to communicate with the apparatus uploading, from the wireless communications appliance, the fuel efficiency values and associative data collected during monitoring to a server connected to a network, accessing, by the server, current fuel pricing data relative to the location of the monitored vehicle, processing, at the server, at least the fuel efficiency values against the current fuel pricing data to derive cost values for operating the monitored vehicle, and serving, or otherwise making the cost information available over the network to the owners or operators of the monitored vehicle.

In one aspect of the method, the wireless communications circuitry is Bluetooth™ circuitry. In one aspect of the method, the driving behaviors monitored include transmission gear shifting, braking, accelerating, and steering. In one aspect of the method, the wireless communications appliance is one of a cell phone, an android device, a tablet computer, or a laptop computer. In one aspect of the invention, the associated driving behaviors effecting fuel consumption are labeled and time-stamped to indicate the sequence and the duration of those driving behaviors.

In one aspect of the method, the network is the Internet network. In one aspect of the method, the fuel is one of gasoline, diesel, or bio-fuel. In one aspect, the vehicle is a hybrid vehicle. In one aspect of the method, the location of the monitored vehicle is determined by global positioning satellite (GPS) data. In one aspect of the invention, the cost information is pushed to the wireless communications appliance when the information becomes available. In one aspect, the cost information is posted to a Webpage owned by the vehicle owner or operator. In another aspect of the method, the cost information is communicated to the wireless appliance using email or text messaging.

In one aspect of the method, the vehicle is one of an automobile, a truck, a bus, a service vehicle, or a recreational vehicle. In one aspect of the method, the current fuel pricing data is accessed from one or more local fuel cost reporting services. In one aspect, the cost information includes a summary of recommendations for correcting driving behaviors to improve fuel efficiency values. In another aspect, the summary includes one or more recommendations for servicing the vehicle.

BRIEF DESCRIPTION OF THE DRAWING FIGURES

DETAILED DESCRIPTION

The inventor provides a device for collecting fuel consumption data of a vehicle and the driving behaviors of its operator and a system for analysis of the data and provision of useful feedback to the operator relative to fuel economy management. The present invention is described in enabling detail using the following examples, which may describe more than one relevant embodiment falling with the scope of the present invention.

Figure 1:
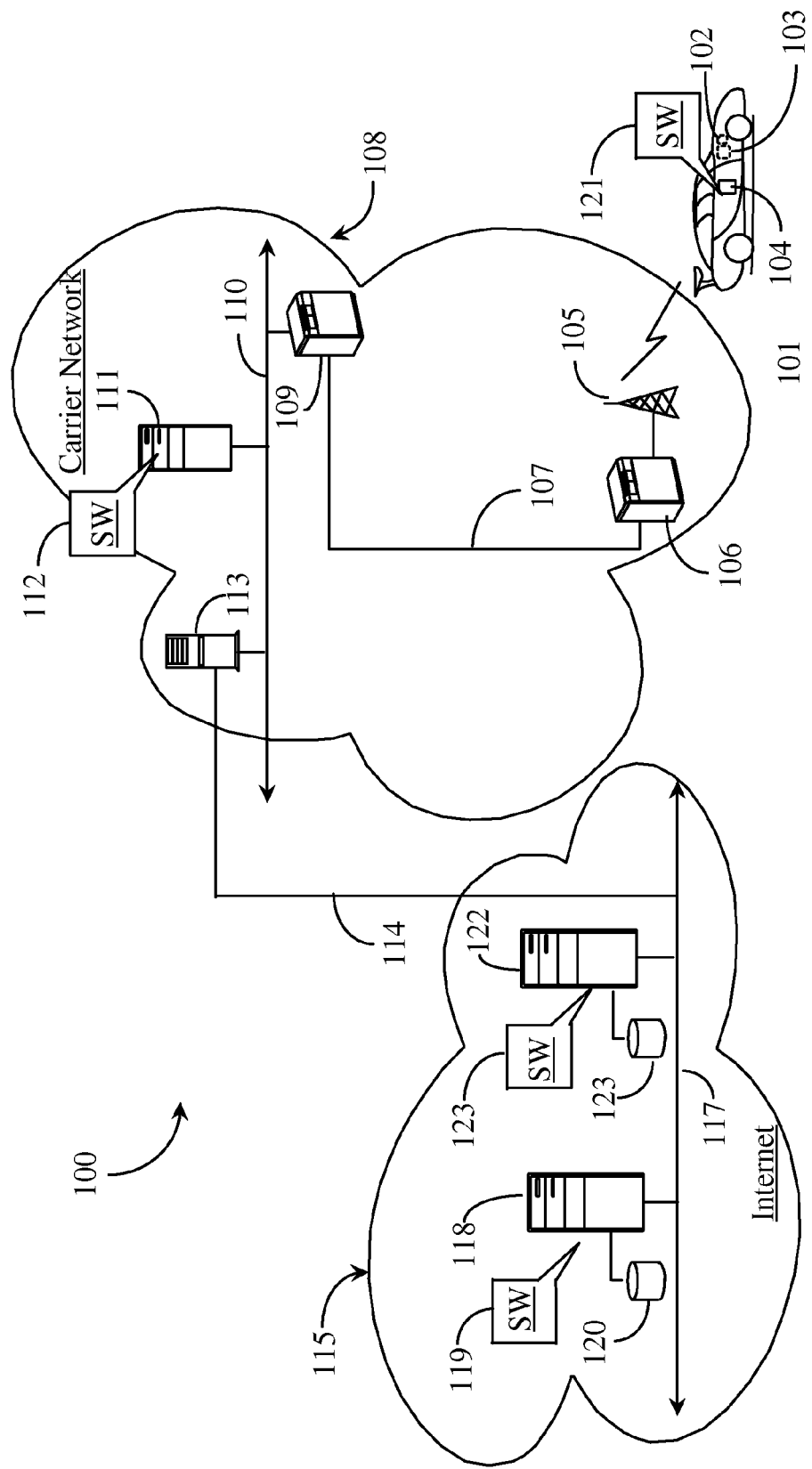
FIG. 1 is an architectural diagram depicting a data network supporting fuel economy management and reporting according to an embodiment of the invention.

FIG. 1 is an architectural diagram depicting a data network 100 supporting fuel consumption data and driving behavioral data collection, analysis, and reporting according to an embodiment of the invention. Data network 100 includes a wireless network 108 and the Internet network 115. Carrier network 108 may be a cellular network or a wireless fidelity (WiFi) network, or some other wireless communications network, including satellite network without departing from the spirit and scope of the invention. Internet network 115 may be a corporate wide area network (WAN) or a municipal area network (MAN), or some other type of digital network without departing from the spirit and scope of the invention. Internet 115 is further exemplified by an Internet backbone 117. Internet backbone 117 includes all of the lines, equipment, and access points that make up the Internet as a whole including any connected sub-networks. Therefore, there are no geographic limitations to the practice of the present invention.

In one embodiment of the present invention, a vehicle 101 is depicted and is equipped with an onboard diagnostics (OBD) system (not illustrated). As is known in the art, the OBD system is accessible via an OBD connector 102. Vehicle 101 may be an automobile, a truck, a bus, or a recreation type vehicle without departing from the spirit and scope of the invention. In one embodiment, the vehicle monitored may be a hybrid vehicle. A fuel consumption data collection device 103 is depicted herein and has connection to the OBD system through an OBD port depicted herein as OBD port 102. Data collection device 103 connects directly to OBD connector 102, which in turn, provides direct access to the onboard diagnostics system. Data collection device 103 is adapted to monitor and record fuel consumption data of vehicle 101 while it is being operated. Fuel consumption data may include the amount of fuel consumed by the vehicle relative to the mileage driven. The mileage data and fuel consumption data may be processed to derive fuel efficiency values for vehicle 101. In one embodiment, the device also monitors certain driving behaviors that may affect fuel efficiency.

Data device 103 is wirelessly enabled in this example with Bluetooth™ wireless technology. A wireless communications appliance 104 is depicted in this embodiment. Wireless communications appliance 104 represents an appliance owned and operated by the owner of vehicle 101. Wireless communications appliance 104 may be a smart phone, an android device, or a computing appliance like a tablet, a notebook, or a laptop computer without departing from the spirit and scope of the invention.

In this example, wireless communication device 104 is a smart phone and will hereinafter be referred to as smart phone 104. Smart phone 104 is network-enabled, meaning that it may be leveraged to access and navigate a network such as Internet network 115 using browser technology. In this example, smart phone 104 and data collection device 103 are wirelessly paired for communication via Bluetooth™ wireless technology.

Smart phone 104 may connect to Internet network 115 via a cellular tower 105 associated with a local base station 106 using network path 107 and a regional base station 109 to communicate with a wireless Internet service provider represented herein by a facility 111 located within carrier network 108. Carrier network 108 includes regional base station 109 and internal network structure 110, which supports 111 running associative software (SW) 112. SW 112 includes all of the required instruction to enable facility 111 to function as a wireless Internet service provider (access point). Carrier network 108 has connection to Internet 115 via gateway 113 and an Internet access line 114.

Internet backbone 117 supports an Internet server 118. Internet server 118 includes a processor, a data repository and a memory, the memory hosting software (SW) 119 executing from a non-transitory medium on the server. Server 118 may be hosted by a third-party providing software to derive fuel efficiency values from collected data according to an embodiment of the present invention. Server 118 has connection to a data repository 120. Data repository 120 may contain client data such as—fuel consumption data and fuel efficiency tendencies, as well as a record of driving behaviors that might be associated with rises and dips in fuel efficiency values derived from collected data. Driving behaviors may include transmission gear shifting, braking, acceleration, steering, and any other driving behaviors relative to fuel consumption without departing from the spirit and scope of the invention. Information and analysis provided by server 118, aided by software 119 may be served or otherwise made available to clients in the field such as one operating vehicle 101.

In use of the invention, an owner or operator of vehicle 101 connects device 103 to the OBD system through OBD port 102 while operating the vehicle. The operator may configure smart phone 104 to wirelessly connect to device 103 automatically when both the device and appliance are booted up or otherwise powered on. In one embodiment of the invention, device 103 has instruction in memory, which when executed, cause a processor on the device to monitor the fuel consumption of vehicle 101 relative to the number of miles driven and, in one embodiment, certain driving behaviors of the vehicle operator. In one embodiment further types of data may be collected if such data types are deemed to have a positive or negative effect on the overall fuel efficiency of the vehicle. Such data types may include, but are not limited to tire size and inflation data, air conditioner (AC) operation, engine thermal data, and so on.

In one embodiment, smart phone 104 has software 121 executing from a non-transitory medium that provides an interface to receive the collected data and data events transmitted thereto from device 103. Data may be collected and transmitted in real time or periodically while the vehicle is being operated. In one embodiment, data collection device 103 has a memory large enough to collect and record fuel consumption data and associated data for transmission to smartphone 104 at a later time regardless of the operation state of the vehicle. In one embodiment, device 103 may access global positioning satellite (GPS) data from the OBD system if so equipped. In another embodiment, device 103 may be GPS-enabled.

In yet another embodiment, the GPS data may be provided by smart phone 104. In this way, the operator's predominate location may be monitored, collected, and stored on data repository 120 connected to server 118 executing software 119. SW 119 includes instruction for processing collected data uploaded to the server by the wireless appliance 104, in this case, a smart phone. The resulting information may include fuel consumption data, which may be mitigated with locally prevalent fuel cost information to provide the operator with useful feedback information for lowering fuel costs, at least partly by optimizing fuel efficiency of the monitored vehicle.

In one embodiment, device 103 may provide fuel consumption and driving behavior data to smart phone 104, which may then be uploaded to server 118 on Internet network 115 in an automated fashion as the data becomes available, or at user-specified time intervals. In another embodiment, data may be uploaded to server 118 at system defined intervals.

An operator of vehicle 101 registered with the service of the invention may request summary or determination information derived from processing of fuel efficiency values and driving behavior analysis through smart phone 104 or any other wireless communications appliance or wired Internet-capable computing appliance. In one embodiment of the invention, the requested information may be sent to the vehicle operator via a smart phone application operating on smart phone 104. In another embodiment, the requested information may be sent to the operator via a text message. In yet another embodiment, the requested information may be sent to the operator via a Webpage owned by the vehicle operator or by the service hosting company or enterprise.

Network backbone 117 supports a server 122. Server 122 includes a processor, a data repository, and a non-transitory medium containing all of the software and instruction to enable operation as an information server connected to the Internet. Server 122, aided by SW 123, is more particularly adapted to provide fuel cost information to requesting entities including server 118. Server 122 includes a data repository 123 adapted to contain current fuel cost information for regions and localities across the nation. Fuel cost information may include retail costs of one or more grades of gasoline. Fuel cost information may also include other types of fuel such as diesel and bio-fuel costs.

In one embodiment, device 103 collects fuel consumption data and mileage data of a monitored vehicle during operation and according to instruction derives a log of fuel efficiency values relative to the amount of fuel consumed per mile of vehicle operation, in this case, driving. This may be accomplished by monitoring the fuel tank level or actual engine fuel intake over time and correlating the data to mileage driven available from the odometer of the vehicle. OBD data may include mileage data. Concurrently, certain driving behaviors might be captured during monitoring and correlated to fuel efficiency spikes and dips noted in the processed data. The driving behaviors may be time stamped and associated in the fuel efficiency value log with the fuel efficiency values reflecting the fuel efficiency at the time that the collected driving behaviors occurred.

In this embodiment, derivation of fuel efficiency values from raw mileage data and raw fuel consumption data occurs on device 103. In another embodiment, the fuel efficiency values might be computed on smart phone 104 with the aid of SW 121. The tagging of certain driving behaviors to spikes and dips in the fuel efficiency value data may also occur on smart phone 104 instead of device 103 without departing from the spirit and scope of the present invention. Server 118 may receive fuel efficiency data for the vehicle plotted over time driven with indication of certain driving behaviors, the place in fuel efficiency timeline including the duration and frequency of those driving behaviors. In one embodiment, the associated driving behaviors effecting fuel consumption are labeled and time stamped to indicate the sequence and the duration of those driving behaviors.

It is noted herein that the vehicle operation may also be tracked relative to GPS data and the information uploaded to server 118 may include the location information of the vehicle relative to the miles driven such that the vehicle trip monitored includes a geo-location vehicle log that correlates to the processed fuel efficiency log of the vehicle for the same period of time.

Server 118 further processes the information by accessing fuel cost information from server 122 and computing the fuel cost data with the fuel efficiency data to determine the costs of operating the vehicle. Additional data other than fuel consumption, driving behaviors, and vehicle component specifications, like tire size, may be collected and incorporated into data processing locally or at the server if it is deemed to positive or negatively effect fuel efficiency.

For example, sensor information may be collected from the onboard diagnostic system or from accessory sensors provided in the vehicle to determine driving terrain like slope, road condition, curves, etc. Drivers may have repetitive driving routes that include physical factors that may affect fuel efficiency negatively. The system may, in one embodiment make suggestions to drivers concerning route changes to improve fuel efficiency and lower costs.

It is noted herein that processed information may be held for access at server 118 in repository 120. The data may be summarized for a user in the form of a report that might be accessed by request or pushed to a Web page for secure access by the registered user. The summary data might include suggestions or recommendation including but not limited to vehicle maintenance procedures, driving behavioral recommendations, fuel type recommendations, route modification recommendations (for repetitive routes), and so on.

Figure 2:
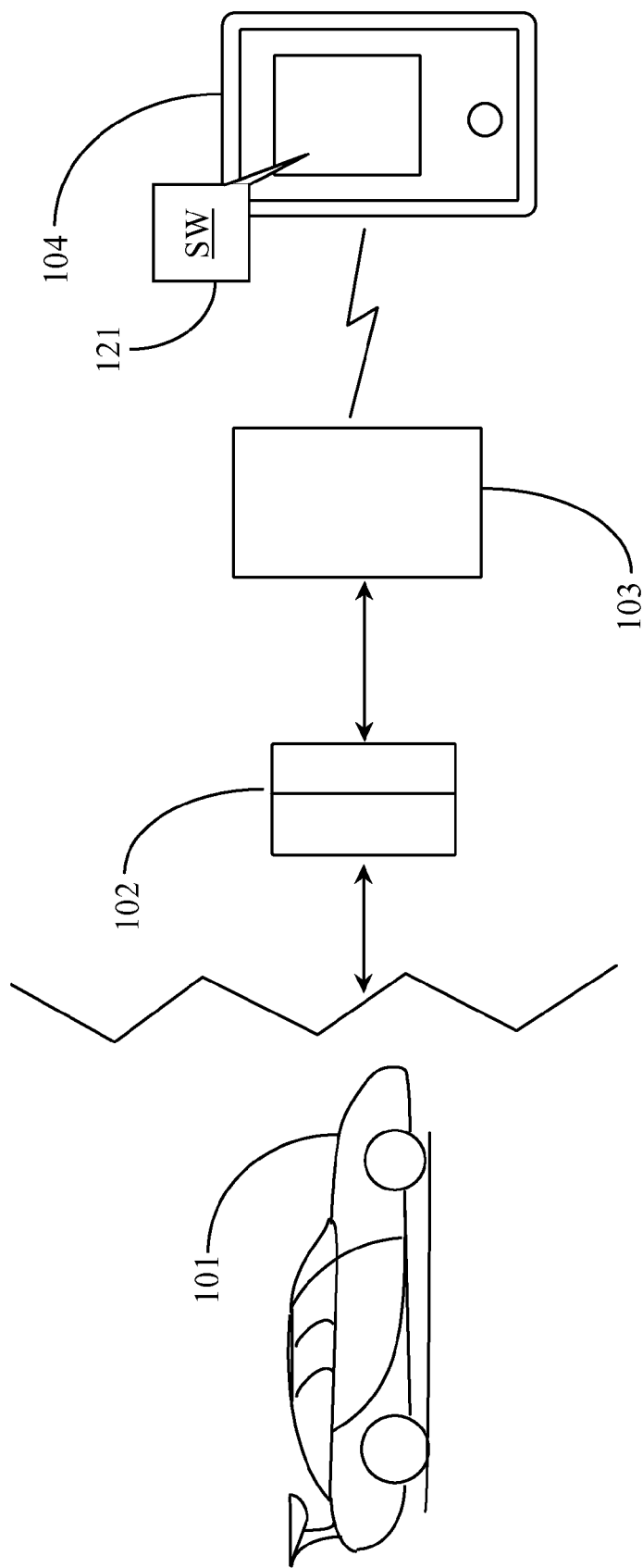
FIG. 2 is a block diagram depicting connectivity between components according to an embodiment of the invention.

FIG. 2 is a block diagram depicting connectivity between components according to an embodiment of the invention. In a preferred embodiment of the invention, vehicle 101 is equipped with an onboard diagnostics system accessible through OBD port 102. Data collection and reporting device 103 can connect directly to OBD port using an OBD connector. OBD-connected device 103 may derive fuel efficiency values from raw fuel consumption data and mileage data. Device 103 may collect other data such as transmission gear shifting data, braking data, acceleration data, and steering data, as well as location data (if vehicle equipped). Device 103 may communicate with smart phone 104 through Bluetooth™ pairing or through another wireless communication protocol like wireless universal serial bus (USB) or near field communication (NFC). SW 121 executing from a non-transitory medium on smart phone 104 aids in coordination and upload of data communicated from device 103 to an associated Internet server like Internet server 118 from FIG. 1.

Figure 3:
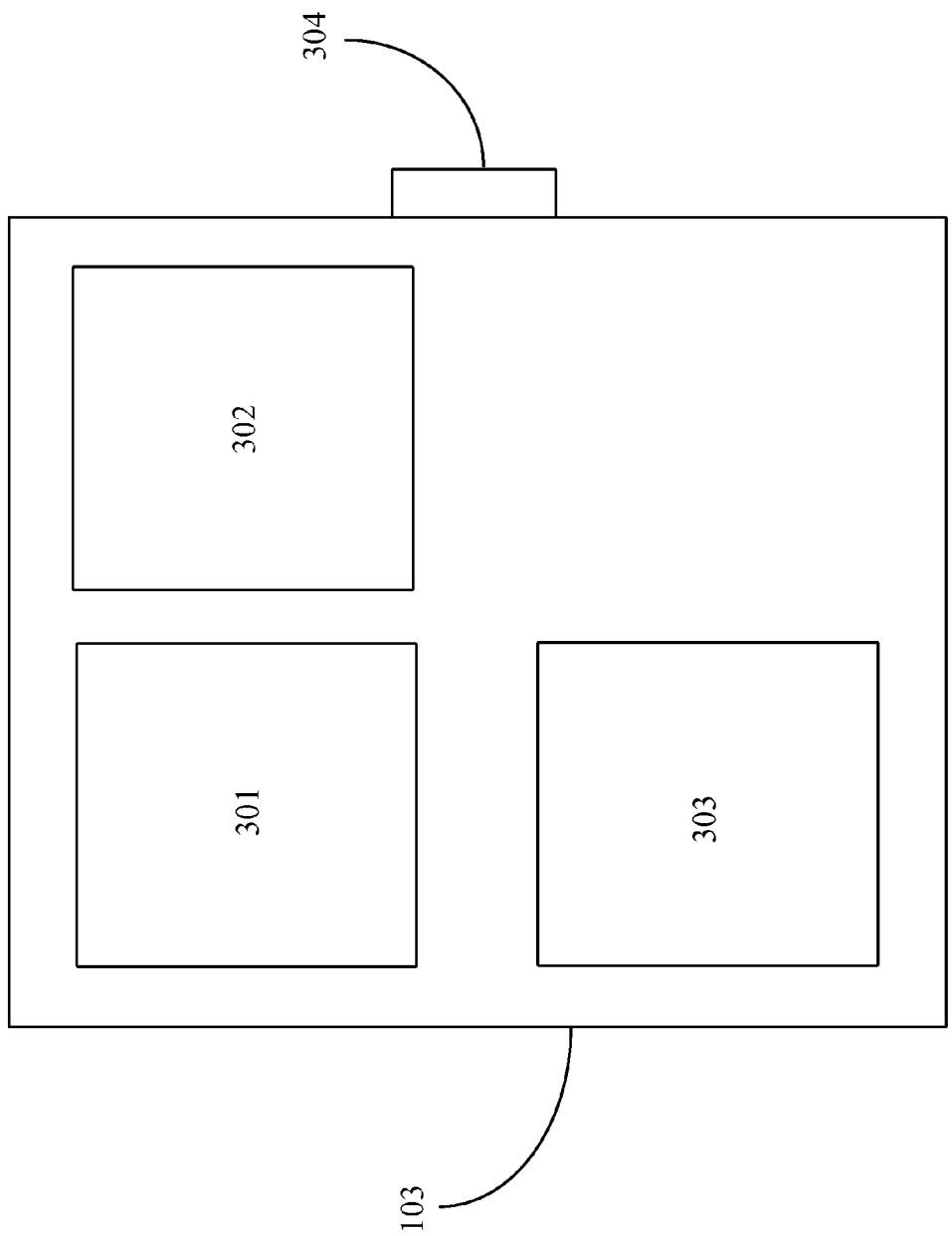
FIG. 3 is a block diagram depicting basic components of the monitoring device of FIG. 2.

FIG. 3 is a block diagram depicting basic components of the data collection and reporting device of FIG. 2. In one embodiment of the invention, data collection device 103 may contain global positioning satellite (GPS) device 301. In one embodiment, the GPS device may be located in a vehicle computing system in vehicle 101. In another embodiment, the GPS device may be located in smart phone 104 of FIG. 2. Fuel consumption and driving behavior device 103 includes a digital processor 302, and Bluetooth™ wireless communications circuitry 303. Device 103 may include other components common to electronics devices without departing from the spirit and scope of the present invention, such as user interfacing features including an on/off switch, a reset button, one or more visual indicators, and so on. Device 103 connects to OBD connector 102 (FIG. 1) using plug 304, which may be a male pin connector.

In this embodiment, Device 103 performs the function of monitoring a host vehicle for fuel consumption trends and driving behaviors such as transmission gear shifting, braking, acceleration, steering, and so on. In another embodiment of the invention, device 103 may also monitor a vehicle's predominate location using global positioning satellite (GPS) device 301. In another embodiment, device 103 may not include global positioning satellite (GPS) device 301, and may instead rely upon the GPS device located in a vehicle computing system in vehicle 101 for its predominate location information. In this embodiment, device 103 might monitor fuel consumption and driving behaviors including AC operation. In yet another embodiment, both device 103 and vehicle 101 may not include a GPS device, and may instead rely upon the GPS device available in smart phone 104 for predominate location information. In this embodiment, device 103 might monitor fuel consumption and driving behaviors.

In one aspect of the invention, the service may determine the actual cost of the fuel used in a monitored trip without depending on GPS location data marking where the vehicle traveled during monitoring. Newer vehicles include a diagnostics mechanism that enables accurate determination of the level of fuel in the fuel tank of the vehicle. This data may be monitored in real time so that the data reveals when a fill up has occurred. When a fill up has occurred, the GPS location of the vehicle may be accessed. The reporting system may then correlate the location coordinates associated with the fill up with a listing of all of the gas stations and current prices surrounding the area resulting in determination of the exact price the user paid for fuel. The only constraint is that the user fills the tank with a pre-specified grade from the optional grades of gasoline, for example.

Data collected by device 103 may be processed on the device before transmission to phone 104. For example, fuel efficiency values may be derived from raw fuel consumption data per miles driven while the vehicle is being driven and monitored by the device. Moreover, certain driving behaviors that occurred during spikes and dips in fuel efficiency over time may be noted and tagged to the timeline of the fuel efficiency log along with actual GPS data. The GPS information may be correlated to the fuel efficiency log at specified intervals such as every few minutes or at some other preset time interval.

Figure 4:
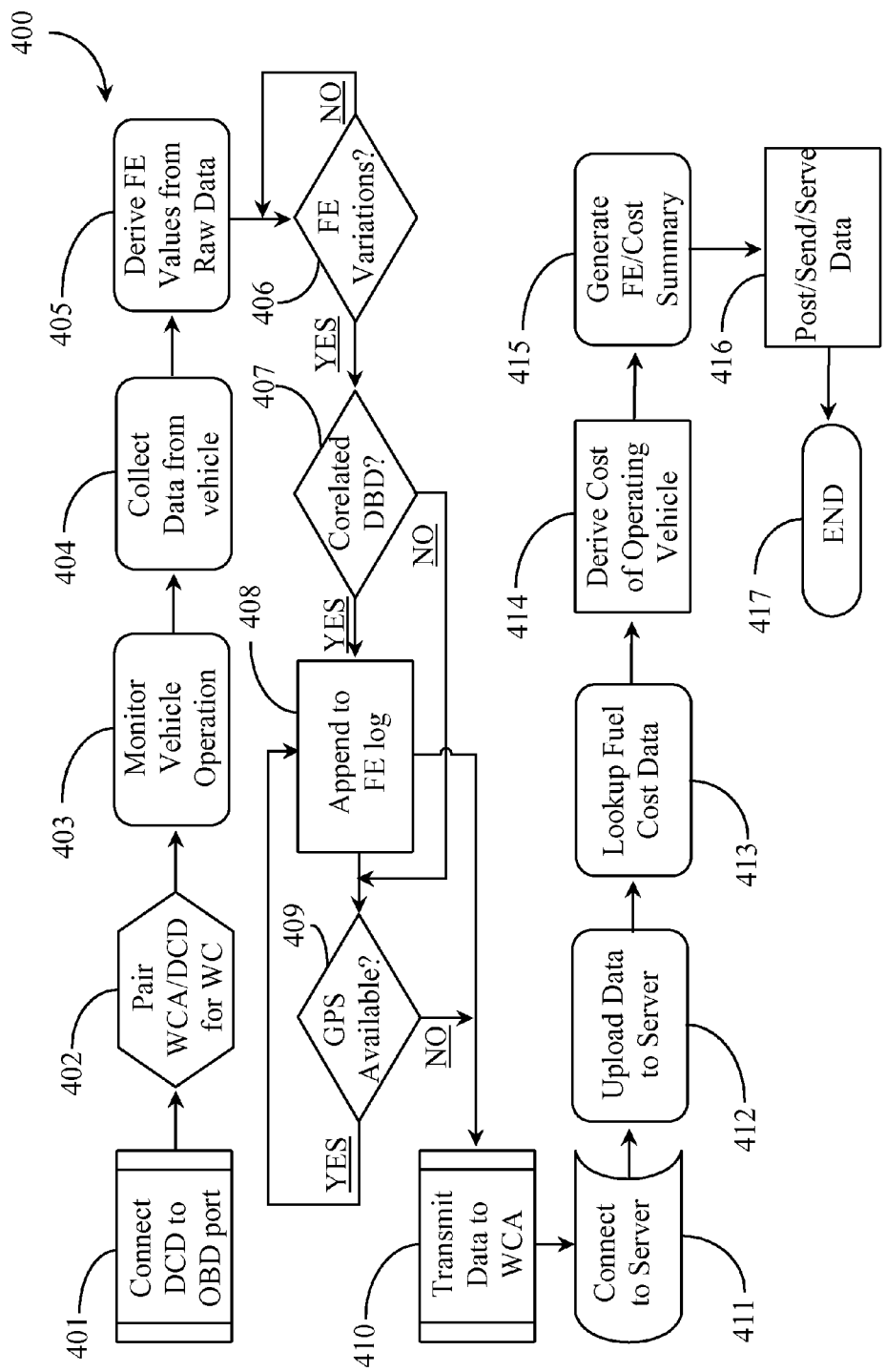
FIG. 4 is a process flow chart depicting acts for gathering, processing and serving fuel economy data.

FIG. 4 is a process flow chart 400 depicting acts for collecting, processing, and reporting or publishing data in one embodiment of the invention. At act 401, a user connects a data collection and reporting device (DCD) analogous to device 103 of FIG. 2 to the OBD port of the vehicle to be monitored. Assuming the fuel consumption and driving behavior device is not already paired with a wireless communications appliance, such as smart phone 104, the user may pair the components for wireless communications such as Bluetooth™ communications at act 402.

In act 403, the user begins operating the vehicle and monitoring of the vehicle commences. The data collection device collects data from the vehicle in act 404. Data may include but is not limited to raw fuel consumption and vehicle mileage. Data collected may also include GPS data, sensor data, driving behavioral data, and vehicle component data. At act 405, the data collection device derives fuel efficiency (FE) values from the collected raw data. Fuel efficiency (FE) values may be time-based and sequentially represented in a data log.

In act 406 it is determined whether there are variations or fluctuations in the FE value log. If it is determined there are no significant fluctuations, for example, spikes or dips in FE values, the process continues to search for variations. If fluctuations in FE values are identified in act 406, it is determined at act 407 whether or not there are correlative driving behavioral data (DBD).

If there are DBD identified as correlating to FE spikes and or dips in act 407, the DBD are appended to the FE values log in act 408. For example, assume that FE values began dipping from time X to time Y and then stabilized after time Y. In this assumption, the device notices that the driving behavior of accelerating to a higher speed occurred at about time X and continued until about time Y. Therefore, the behavior "acceleration to speed Z" is appended or otherwise tagged to the FE value log. In one embodiment, it may also be determined based on available sensor data that the acceleration event occurred during travel up a slope having an average rise. Thus, the dip in FE occurring between time X and time Y might have resulted from a combination of acceleration past a certain speed and driving up a slope. Further refinement might pin most of the responsibility for the FE dip on driving up the slope rather than acceleration.

In act 409, the device determines if GPS data is available during the monitored vehicle operation. If GPS data is not available on the vehicle or on the data collection device, then the process skips over to act 410 where the data collected and processed is transmitted to the wireless communications appliance (WCA). The WCA may provide location information to correlate to vehicle operating periods. Such data may be collected in intervals that are specified by the service or by a user customizing the service for their situation. In one embodiment, the WCA may begin recording location in intervals of time such as every few minutes of time after monitoring begins. If the GPS data is available in act 409, the process loops back to act 408 and the location data may be appended to the FE log.

The data collection and reporting device transmits the data to a WCA such as a smart phone in act 410. It is noted herein that GPS location information might be supplied by the WCA and appended to the FE log on the WCA. At act 411, the WCA connects online to a server analogous to server 118 of FIG. 1 in act 411. Once the connection with the server is established, the WCA uploads the collected and processed data for storage at the server in act 412.

The server may access or look-up fuel cost data hosted online, for example, in a server like server 122 of FIG. 1. Server 122 may be a private access or public access data server adapted to serve cost data for fuel available locally and regionally. The server may contain the station information, the types of fuel and grades of fuel available at that station, and the current pricing of the fuel. In act 413, the cost data is for the fuel type used in the monitored vehicle and based on the location attributed to the vehicle monitoring operation. So if the monitored operation occurred in central California, the cost data reflects the current average pricing of fuel available in the same local. In one aspect of the method, actual fuel expenditures may be discovered during monitored vehicle operation in real time or from the recorded log data. This may be accomplished by detecting when the level of fuel in the tank of the monitored vehicle has risen indicating a fuel purchase. The current GPS location of the fueling events may be taken and recorded and later, correlated with a listing of all of the fuel outlets or gas stations in the region along with the current prices for the types of fuel available. Given the knowledge of the exact fuel type and grade used in the vehicle, the exact price paid at the pump can be calculated and recorded. In this way, the total fuel cost of a monitored trip, for example, may be accurately discovered in automated fashion.

The cost of operating the vehicle during the monitored period is derived in act 414 from the cost data for fuel in the local of the operation and from the FE values. The data may be used to generate a summary relevant to fuel efficiency and cost for the monitored period. In one embodiment, the summary covers an extended period including multiple monitored vehicle operations conducted over a larger period such as the summer driving season or the winter driving season.

In act 416, the summary information with links to more granular detail might be posted to a Web page frequented by the user such as a Facebook™ page or any Web page owned by the user. In act 416, the server may send or "push" the summary data with links to more granular data to the client using text messaging, email, or another media such as voice mail, etc. In act 416, the server may serve the summary information with links to the client WCA using a client server connection upon request by the client. The process ends at act 417.

It is noted herein that in the case of a shared vehicle, multiple operators may have access to the same information derived from vehicle monitoring, data collection and data processing. In the case of multiple similar vehicles owned by a single entity, such as a fleet of service vehicles, for example, the processed information available to the entity might derive from multiple vehicles monitored in the field to reflect averaged data for the fleet. In this case granularity may extend to each vehicle that was actually monitored and to actual driving behaviors of the operators of those vehicles. In this way, detailed insight into the cost factors of vehicle operation as well as recommended optimizations of fuel efficiency through modification of driving behaviors, vehicle mechanical states, and so on, are provided to enable fuel cost saving for individuals and for certain business entities. The system of the invention may be practiced in light of individual consumers, corporate consumption, and in various transit models such as bus lines, trucking fleets, rescue service vehicles, etc.

What is claimed is:

1. An apparatus comprising:
   a connector to an on board diagnostics (OBD) port of a vehicle;
   wireless communications circuitry; and
   a processor and a memory, local to the vehicle, the memory storing instructions that when executed by the processor cause the processor to:
   monitor fuel consumption of the vehicle relative to mileage driven to derive fuel efficiency values over time;
   monitor behaviors of a driver of the vehicle concurrently over time with the fuel consumption and associate the behaviors of the driver to data indicating any dips and rises in the fuel efficiency values; and
   transmit the fuel efficiency values and the data to a wireless communications appliance wirelessly paired to communicate with the apparatus;
   wherein the wireless communication apparatus connects to an Internet and sends the fuel efficiency values and the data to a computerized server having memory executing instructions for connecting to a database, retrieving current fuel prices stored in the database, available local to the vehicle, and generates a summary of vehicle operation cost including recommendations for correcting driver behavior and vehicle service to improve fuel efficiency, providing said summary to the driver via the wireless communication apparatus.

2. The apparatus of claim 1, wherein the wireless circuitry provides a short distance wireless universal serial bus (USB) or near field communication (NFC).

3. The apparatus of claim 1, wherein the monitored behaviors of the driver include transmission gear shifting, braking, accelerating, and steering.

4. The apparatus of claim 1, wherein the wireless communications appliance is one of a smart phone, a tablet computer, or a laptop computer.

5. A method comprising acts:
   monitoring consumption of fuel by a vehicle relative to mileage driven and deriving fuel efficiency values over time via a local apparatus having a connector to an on board diagnostics (OBD) port of a vehicle, wireless communications circuitry, a processor and a memory;
   monitoring, via the apparatus, driving behavior over time of a driver of the vehicle concurrently with fuel consumption and associating certain driving behaviors to any dips and rises in the fuel efficiency values;
   transmitting, from the apparatus, the fuel efficiency values and associative data collected during monitoring to a wireless communications appliance wirelessly paired to communicate with the apparatus;
   uploading, from the wireless communications appliance, the fuel efficiency values and associative data collected during monitoring to a server connected to a network;
   accessing, by the server, current fuel pricing data relative to the location of the vehicle;
   processing, at the server, at least the fuel efficiency values against the current fuel pricing data to derive cost values for operating the vehicle; and
   generating a summary of the cost values and the associated certain driving behaviors, the summary including recommendations for correcting driver behavior and vehicle service to improve fuel efficiency, and sending said summary over the network to the driver of the vehicle via the wireless communications apparatus.

6. The method of claim 5, wherein the wireless circuitry provides a short distance wireless universal serial bus (USB) or near field communication (NFC).

7. The method of claim 5, wherein the monitored behaviors of the driver include transmission gear shifting, braking, accelerating, and steering.

8. The method of claim 5, wherein the wireless communications appliance is one of a smart phone, a tablet computer, or a laptop computer.

9. The method of claim 5, wherein the associated certain driving behaviors effecting fuel consumption are labeled and time stamped to indicate the sequence and the duration of said driving behaviors.

10. The method of claim 5, wherein the network is an Internet network.

11. The method of claim 5, wherein the fuel is one of gasoline, diesel, or a bio-fuel.

12. The method of claim 5, wherein the vehicle is a hybrid vehicle.

13. The method of claim 5, wherein the location of the monitored vehicle is determined by global positioning satellite (GPS) data.

14. The method of claim 5, wherein the generated summary is made available to a third-party communications appliance when available at the server.

15. The method of claim 5, wherein the generated summary is posted on a webpage owned by the driver, third-party, vehicle owner or operator.

16. The method of claim 5, wherein the generated summary is communicated to the wireless communication appliance using email or text messaging.

17. The method of claim 5, wherein the vehicle is one of an automobile, a truck, a bus, a service vehicle, or a recreational vehicle.

18. The method of claim 5, wherein the current fuel pricing data is accessed from one or more local fuel cost reporting services.

* * * * *